United States Patent Office 3,026,280
Patented Mar. 20, 1962

3,026,280
IMPROVED ASPHALT COMPOSITIONS
David Apotheker, Anchorage, Ky., assignor to E. I. du Pont de Nemours and Company, Wilmington, Del., a corporation of Delaware
No Drawing. Filed Aug. 19, 1959, Ser. No. 834,669
4 Claims. (Cl. 260—28.5)

The present invention is directed to bituminous compositions which may be utilized in road-making. This invention is more particularly related to improving such bituminous compositions by incorporating therein certain copolymers of chloroprene.

It is known that incorporating small amounts of polychloroprene under certain conditions into asphaltic materials greatly improves certain physical properties which are closely related to the performance of these asphalts as road-making materials. Even though the amount of neoprene used is of the order of only 3% of the asphalt, the increased cost on a percentage basis for a relatively very cheap material such as asphalt is high. This increase in cost is justified by the improvement in the properties of the asphalt, expressed in much longer life for the road surfaces made therefrom. The need, however, for an additive giving the same effects when used in even smaller amounts is obvious.

It has now been discovered that certain copolymers of chloroprene with 2,3-dichlorobutadiene-1,3 have a significantly greater effect than polychloroprene itself on asphalt. It has also been discovered that these copolymers of chloroprene may be utilized in significantly smaller amounts to produce the same effects as achieved with the comparative prior art polymers.

It is an object of this invention to provide novel bituminous compositions having important utility in road-making. It is a further object of this invention to provide such novel bituminous compositions by incorporating therein certain copolymers of chloroprene as hereinafter described. These and other objects will become apparent in the following description and claims.

More specifically, the present invention is directed to a composition comprising a bituminous material having incorporated therein about 0.01 to 5.0% of a plastic copolymer of chloroprene and 2,3-dichlorobutadiene-1,3 made from a monomer mixture containing 20 to 80% of the latter and 0.1 to 0.7% an aliphatic mercaptan. Preferably the amount of copolymer incorporated is between 0.75 and 3%, the proportion of dichlorobutadiene between 30 and 60% and the proportion of mercaptan 0.2 to 0.4%.

The copolymer utilized according to this invention is preferably made in aqueous alkaline emulsion in which the dispersing agent is a salt of a long-chain fatty acid or rosin acid. The polymerization is usually stopped when 50 to 95% and preferably about 65-75% of the monomer mixture has been polymerized. The unchanged monomers are then removed by distillation, a convenient method which avoids foaming and coagulation of the latex involving steam distillation under conditions of turbannular flow, as taught in U.S. 2,467,769. The aliphatic mercaptans preferably contain 6 to 18 carbon atoms and preferably are saturated, primary and unbranched. Examples of this preferred class are n-hexyl, octyl, dodecyl, and stearyl mercaptans. Examples of the less preferred secondary and tertiary mercaptans are the tertiary dodecyl, tertiary tetradecyl, and secondary tridecyl mercaptans.

The conventional catalysts used for the polymerization of dienes and particularly of chloroprene may be used here. Examples of these are ferricyanides and persulfates. Similarly, the usual "short-stops," such as described in U.S. 2,576,009 may be used. These also serve as stabilizers for the isolated polymer. Conventional rubber antioxidants may also be added.

The copolymers are preferably incorporated in the asphalt by direct mixing of the latex or by incorporating the solid copolymer in finely divided form, such as is obtained by spray drying or by grinding at low temperature. In any case, the asphalt must be in fluid form, either fused or in solution. A convenient method for incorporating latex into asphalt on a large scale involves injecting a stream of latex into molten asphalt at 140 to 180° C. and then passing the mixture through a tube under condition of turbannular flow, whereby the elastomer is uniformly incorporated in the asphalt and the water of the latex is removed as steam without objectionable foaming.

Representative examples illustrating the present invention follow.

A copolymer typical of those used in the present invention is made by emulsifying 60 parts by weight of chloroprene and 40 of 2,3-dichlorobutadiene-1,3 containing 0.35 part of primary normal dodecyl mercaptan and 3 parts of disproportionated rosin in 109 parts of water containing 0.55 part of sodium hydroxide, and 0.3 part of sodium sulfite, the rosin being neutralized by the sodium hydroxide to form the emulsifying agent. The catalyst, a 10% aqueous solution of potassium ferricyanide, is added as needed to maintain the polymerization at 30° C. The polymerization is stopped by adding a dispersion of phenothiazine (thiodiphenylamine) and p-tertiary butyl catechol when 70% of the total monomers have been polymerized. The unchanged portion is then removed by steam distillation by passage with steam at reduced pressure through a tube under conditions of turbannular flow, referred to above.

Other copolymers within the scope of the present invention are made by obvious variations of the heretofore described procedure.

EXAMPLE 1

The described copolymer latex is incorporated into an asphalt of 85–100 penetration grade so as to give 1.5 parts of copolymer per 100 parts of asphalt. To do this, the asphalt is heated to 150° C. and the latex is added slowly with agitation. The water boils off, excessive foaming being avoided by slow addition of the latex. A good dispersion of the copolymer in the asphalt results.

The following tests were applied:

*Tests*

Low temperature ductility: (ASTM–D–113–44). This is measured by mechanically pulling a molded briquet of asphalt at 4° C. at a rate of pull of 5 cm. per min. until it breaks and measuring the length of the specimen in centimeters at the breaking point.

Benson pull-test: (Benson, Jewell R.—"New Concepts for Rubberized Asphalts," Roads and Streets, April, 1955). A ⅞-inch diameter steel hemisphere is embedded in a hot asphalt blend so that the flat surface is flush with the asphalt surface. The asphalt (35–40 ml.) is contained in a 3-ounce seamless ointment can. After conditioning the sample at 25° C. for 24 hours, the head is pulled from the sample at a constant rate of 20 inches per minute using the Instron or Scott tester. The area under the "long-pull" portion of the curve, an area bounded by a line being drawn from the initial peak load point to the zero force axis, corresponding in inch/pounds done upon the sample, is the "tenacity" of the material. The results are given in the accompanying tables, along with those obtained using for comparison unmodified asphalt and asphalt modified by incorporating ordinary polychloroprene.

The copolymer used in Example 1 is incorporated in the same way into asphalt in other proportions to give the compositions of Table I. The copolymer used in Tables II and III are made like that used in Example 1, with the indicated variations in the amounts of mercaptan, and of 2,3-dichlorobutadiene, and in the percentages of monomers converted.

TABLE I.—EFFECT OF VARYING THE AMOUNT OF COPOLYMER ON THE PROPERTIES OF THE ASPHALT

| Percent Copolymer | Ductility at 4° C., Centimeters | Tenacity, In./Pds. |
| --- | --- | --- |
| 0.00 | 7 | 6 |
| 0.01 | 8 | 17 |
| 0.10 | 11 | 29 |
| 0.75 | 31 | 115 |
| 1.0 | 47 | 132 |
| 1.5 | 54 | 143 |
| 1.5 Polychloroprene* | 25 | 90 |

*Made by the same general procedure as the copolymer used in the other compositions of the table.

It can be seen in this table that the copolymer produces an observable effect at a concentration as low as 0.01% and that the effect of 0.75% is somewhat greater than the effect of 1.5% of polychloroprene. Still further increase in the amount of the copolymer further increases the ductility and tenacity, but not to as great an extent. Above 5%, the copolymer tends to gel.

TABLE II.—EFFECT OF VARYING THE AMOUNT OF MERCAPTAN USED IN MAKING THE COPOLYMER OF EXAMPLE 1 (1.5 PARTS OF COPOLYMER USED IN 100 PARTS OF ASPHALT THROUGHOUT)

| Parts of Dodecyl Mercaptans Per 100 Parts of Monomer | Ductility |
| --- | --- |
| 0.10 | 15 |
| 0.30 | 50 |
| 0.35 | 36 |
| 0.40 | 29 |
| 0.50 | 28 |

This indicates that the best results are obtained with about 0.30% mercaptan but it will be noted that all the copolymers tested in the Table II gave a greater effect than the same quantity of polychloroprene (see Table I, last line).

TABLE III.—EFFECT OF VARYING THE AMOUNT OF DICHLOROBUTADIENE AND THE PERCENT CONVERSION OF THE MONOMERS

| Percent Dichlorobutadiene in the Monomer Mixture | Percent Conversion of the Monomers | Ductility | Tenacity |
| --- | --- | --- | --- |
| 20 | 50 | | 132 |
|  | 60 | 47 | |
|  | 70 | | 137 |
|  | 80 | 27 | |
|  | 90 | | 133 |
| 40 | 50 | 35 | 146 |
|  | 70 | 54 | 143 |
|  | 90 | 58 | 135 |
|  | 50 | | 150 |
| 60 | 60 | 27 | |
|  | 70 | | 149 |
|  | 80 | 47 | |
|  | 90 | | 117 |
| 0 | 70 | 25 | 90 |

The above results were obtained for 1.5% of the polymer in asphalt. Each polymer was made with 0.35 part of dodecyl mercaptan.

Table III indicated that, in general, the best results are obtained by using about 40% of the 2,3-dichlorobutadiene-1,3 in the monomer mixture and by polymerizing to about 70% conversion. Again, however, all the copolymers tested gave greater effects than the same quantity of polychloroprene.

Although the above examples illustrate the use of only dodecyl mercaptan as the modifying or chain transfer agent, the use of other mercaptans within the limits of the invention could similarly be fully illustrated, if space allowed. For example, n-hexyl mercaptan used in place of dodecyl mercaptan in making the copolymer used in Example 1 gives identical results, while tertiary tetradecyl mercaptan, an example of the less preferred class of branched mercaptans, gives a tenacity of 101, which is still much greater than the effect of the same quantity of polychloroprene. It is often advantageous to use mixtures of mercaptans and to add part of the mercaptan during the course of the polymerization. Thus the preparation of the copolymer used in Example 1 may be modified by using only 0.2 part of dodecyl mercaptan at the start and adding 0.15 part of tertiary tetradecyl mercaptan when the conversion reaches 50%. When the polymerization is carried to 85%, 1.5% of the product still gives a tenacity of 143 in asphalt.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition comprising an asphalt having incorporated therein from about 0.01 to about 5.0% based on the weight of said asphalt of a plastic copolymer of chloroprene and 2,3-dichlorobutadiene-1,3, said copolymer being made from a monomeric mixture of chloroprene and 2,3-dichlorobutadiene-1,3, said monomeric mixture containing 20–80% by weight of 2,3-dichlorobutadiene-1,3 and from 0.1 to 0.7% of an aliphatic mercaptan.

2. A composition comprising an asphalt having incorporated therein from about 0.75 to about 3% based on the weight of said asphalt of a plastic copolymer of chloroprene and 2,3-dichlorobutadiene-1,3, said copolymer being made from a monomeric mixture of chloroprene and 2,3-dichlorobutadiene-1,3, said monomeric mixture containing 30–60% by weight of 2,3-dichlorobutadiene-1,3 and from 0.2 to 0.4% of an aliphatic mercaptan.

3. A composition according to claim 2 wherein the aliphatic mercaptan is dodecyl mercaptan.

4. A composition according to claim 2 wherein said copolymer is polymerized to about 70% conversion.

References Cited in the file of this patent

UNITED STATES PATENTS

| 2,493,798 | Abernathy et al. | Jan. 10, 1950 |
| 2,868,749 | Hugg | Jan. 13, 1959 |